United States Patent
Inoue et al.

(10) Patent No.: US 8,035,934 B2
(45) Date of Patent: Oct. 11, 2011

(54) SHIFT SWITCHING DEVICE AND SHIFT SWITCHING METHOD

(75) Inventors: Yuji Inoue, Nissin (JP); Eiji Isobe, Kariya (JP); Shigeru Kamio, Nagoya (JP)

(73) Assignees: Toyota Jidosha Kabushiki Kaisha, Aichi-ken (JP); Denso Corporation, Aichi-pref. (JP)

( * ) Notice: Subject to any disclaimer, the term of this patent is extended or adjusted under 35 U.S.C. 154(b) by 461 days.

(21) Appl. No.: 12/241,381

(22) Filed: Sep. 30, 2008

(65) Prior Publication Data

US 2009/0091866 A1    Apr. 9, 2009

(30) Foreign Application Priority Data

Oct. 3, 2007  (JP) ................ 2007-260048

(51) Int. Cl.
*H02H 7/08*  (2006.01)

(52) U.S. Cl. ........... 361/31; 318/400.02; 318/400.33; 318/434; 318/446; 361/18; 180/65.21; 180/65.265; 180/65.275; 180/65.285; 701/22; 701/29; 701/31; 701/33; 701/35; 702/65; 702/64

(58) Field of Classification Search ........... 318/400.02, 318/400.33, 434, 446; 180/65.21, 65.265, 180/65.275, 65.285; 361/31, 18, 23; 701/22, 701/29, 31, 33, 34, 35; 702/65, 64
See application file for complete search history.

(56) References Cited

U.S. PATENT DOCUMENTS

| | | | | |
|---|---|---|---|---|
| 4,584,505 A | * | 4/1986 | Chung et al. | 318/400.13 |
| 4,896,089 A | * | 1/1990 | Kliman et al. | 318/701 |
| 6,911,798 B2 | * | 6/2005 | Hori et al. | 318/602 |
| 6,914,408 B2 | * | 7/2005 | Sawada et al. | 318/727 |
| 7,239,097 B2 | * | 7/2007 | Hashimoto | 318/400.08 |
| 7,629,760 B2 | * | 12/2009 | Isobe et al. | 318/446 |
| 2006/0138880 A1 | * | 6/2006 | Kimura et al. | 310/68 B |

FOREIGN PATENT DOCUMENTS

| | | |
|---|---|---|
| JP | 2000-170905 A | 6/2000 |
| JP | 2004-129450 A | 4/2004 |
| JP | 2006-336710 A | 12/2006 |

* cited by examiner

*Primary Examiner* — Rita Leykin
(74) *Attorney, Agent, or Firm* — Sughrue Mion, PLLC (57) ABSTRACT

A shift-by-wire shift switching device and shift switching method that switch a shift range of an automatic transmission using an electric motor. The shift switching device includes a controller that determines whether a fault has occurred in a current supply line of each phase of the electric motor on a phase-by-phase basis, executes an open-loop control of the electric motor using only the phases in which it has been determined that a fault has not occurred, and determines whether a fault has occurred in the current supply line by detecting an activation state of the electric motor when the open-loop control of the electric motor is executed. Therefore, it is possible to determine whether a fault in the motor is a short-circuit fault or a break fault, without addition of a part such as a short-circuit detection sensor.

12 Claims, 6 Drawing Sheets

SHIFT SWITCHING DEVICE AND SHIFT SWITCHING METHOD

INCORPORATION BY REFERENCE

The disclosure of Japanese Patent Application No. 2007-260048 filed on Oct. 3, 2007, including the specification, drawings and abstract is incorporated herein by reference in its entirety.

BACKGROUND OF THE INVENTION

1. Field of the Invention

The present invention relates to a shift-by-wire type shift switching device and shift switching method that switch the shift range of an automatic transmission by an electric motor.

2. Description of the Related Art

In a vehicle powered by an engine (internal combustion engine), automatic transmissions that automatically set an optimal gear ratio between the engine and the drive wheels are conventionally used to transmit the torque and rotational speed generated by the engine to drive wheels in accordance with the running state of the vehicle.

Examples of automatic transmissions that a vehicle may be equipped with include planetary gear type transmissions that set a gear step using a clutch, a brake, and a planetary gear device, and belt type continuously variable transmissions (CVT) that adjust the gear ratio steplessly.

In vehicles equipped with a planetary gear type automatic transmission, a gear shift map having gear shift lines (gear step switching lines) for obtaining an optimum gear step according to the vehicle speed and the throttle opening (or accelerator operation amount) may be stored in an ECU (Electronic Control Unit). A target gear step is computed based on the vehicle speed and a throttle opening by referencing the gear shift map, and based on the target gear step, frictional engagement elements such as a clutch, a brake, and a one-way clutch are engaged or released into a predetermined state to thereby automatically set the gear step (gear shift step).

In addition, a belt-type continuously variable transmission is configured such that a belt is wound around a primary pulley (input-side pulley) and a secondary pulley (output-side pulley) each having a pulley groove (V groove), and the groove width of the pulley groove of one of the pulleys is increased while reducing the groove width of the pulley groove of the other pulley, thereby continuously varying the winding radii (effective diameters) of the belt on the respective pulleys to thereby set the gear ratio steplessly.

As an example of a control device for controlling such an automatic transmission, there is a shift switching device of a so-called shift-by-wire type, which electrically detects the shift range position of the automatic transmission by a sensor, and switches the manual valve of the automatic transmission by driving a shift-switching electric motor based on the detection signal, thereby switching shift positions such as P (Parking), R (Reverse), N (Neutral), and D (Drive).

According to such a shift-by-wire type shift switching device, unlike a common shift switching device, that is, unlike a shift switching device of a type in which the shift range of the automatic transmission is directly switched by a driver's shift lever operation, there is no need for a mechanical connection between the shift lever and the shift range switching mechanism. Thus, there are no constraints on layout when installing these components in the vehicle, thus achieving enhanced freedom of design. Also, the shift-by-wire type shift switching device has the advantage of allowing easy mounting onto the vehicle.

As an example of an electric motor applied to a shift switching device, there is a brushless type motor such as a switched reluctance motor (SR motor) which is structurally simple and inexpensive. Also, some of motors applied to a shift switching device are of a type which is installed with an encoder that outputs a pulse signal synchronously with the rotation of a rotor, counts the pulse signal of the encoder, and detects the rotational position of the rotor based on the count value to sequentially switch a current supply phase, thereby rotationally driving the rotor. In this type of a motor with an encoder, since the rotational position of the rotor may be detected based on the encoder count value after start-up, it is possible to rotate the rotor to a target position through a feedback control system (F/B control system).

In the case of a shift-by-wire type shift switching device, there is a fear that switching of the shift range may become impossible in the event of a fault in a shift-switching electric motor. Thus, it is necessary to carry out a failsafe control Examples of techniques related to a motor fault include the techniques described in Japanese Patent Application Publication No. 2000-170905 (JP-A-2000-170905) and Japanese Patent Application Publication No. 2004-129450 (JP-A-2004-129450).

In the technique described in JP-A-2000-170905, a break/short-circuit fault is determined from a current flowing in the winding of each phase of an electric motor that is a drive source of a shift switching device, and upon determining a fault, the driver is notified of the fault by the lighting of an alarm lamp or the like. In the technique described in JP-A-2004-129450, a break detection circuit made up of two resistors is provided in the current supply line of the winding of each phase of an electric motor, thereby detecting a break in the winding of each phase on a phase-by-phase basis.

In a shift-by-wire type shift switching device, if a ground short-circuit occurs in one phase of an electric motor (for example, a three phase AC motor), the faulty phase remains energized, and since the faulty phase drags the other two phases, it is impossible to start up the rotation of the rotor of the electric motor. In contrast, in the case of a break fault, there are situations where it is possible to start up the rotation of the rotor. That is, if a break occurs in one of the three phases, current cannot be supplied to the winding of the phase in which the break has occurred, but the rotor may still be rotated by supplying current to the windings of the other two phases. Thus, if there is a break fault, there are situations where it is possible to continue switching of the shift range by rotating the electric motor, and it is desired to realize this.

However, since the fault detecting means of the related art (including the techniques described in JP-A-2000-170905 and JP-A-2004-129450) cannot discriminate between a break fault and a short-circuit fault, switching of the shift range by motor drive is not carried out even in the event of a break fault. That is, if current is supplied to the drive coil of an electric motor when it is impossible to discriminate between a break fault and a short-circuit fault and the motor fault is a short-circuit fault, there is a fear of an over-current flowing to the current supply line in the faulty phase. To avoid this, if a break/short-circuit fault occurs, the supply of current to the drive coil is stopped regardless of whether the fault is a break fault or a short-circuit fault.

Although it is possible to provide a short-circuit detection sensor to allow discrimination between a break and a short-circuit, in this case, the number of parts increases, which disadvantageously leads to an increase in cost. Also, it is not easy to realize a system that detects a ground short-circuit by using a sensor.

SUMMARY OF THE INVENTION

The present invention provides a technique that determines a break/short-circuit when an electric motor is at fault, without additional parts such as a sensor, in a shift-by-wire type shift switching device that switches the shift range of an automatic transmission using an electric motor.

Accordingly, the present invention employs the following principle for solving the problem. In a shift switching device and shift switching method of a shift-by-wire type, a faulty phase is determined when a break/short-circuit fault occurs in an electric motor, activation of the electric motor is attempted by using a normal phase other than the faulty phase, and the activation state of the electric motor is detected to thereby determine a fault in a current supply line. If this electric motor is activated, the fault is determined to be a break fault, and if the electric motor is not activated, the fault is determined to be a short-circuit fault. Through this determination process, determination of a break/short-circuit may be made when the electric motor is at fault, without addition of a part such as a short-circuit detection sensor.

Specifically, the present invention assumes a shift switching device and shift switching method of a shift-by-wire type which switch the shift range of an automatic transmission using an electric motor. Further, in the shift switching device and the shift switching method as described above, a controller determines a fault in a current supply line in each phase of the electric motor on a phase-by-phase basis, carries out open-loop control of the electric motor only in a normal phase without using the faulty phase, and determines a fault in a current supply line by detecting an activation state of the electric motor upon carrying out the open-loop control of the electric motor. In this case, it is also preferable that the controller determine a fault in a current supply line to be a "short-circuit fault" when the electric motor does not activate upon carrying out the open-loop control of the electric motor.

With the above-mentioned specific matters, if a fault occurs in the electric motor, the faulty phase may be determined. It should be noted, however, that it is not possible to distinguish a break/short-circuit fault through this faulty phase determination. Accordingly, in the shift switching device and the shift switching method as mentioned above, according to the present invention, if a fault has occurred in the electric motor, an open-loop control of the electric motor is executed by using only a normal phase without using the faulty phase to thereby determine a break fault and a short-circuit fault.

According to the present invention, determination as to whether the fault in the electric motor is a short-circuit fault or a break fault may be made without addition of a part such as a short-circuit detection sensor. If it is determined as a result that the fault is a break fault (a break fault in one phase), it is possible to rotationally drive the electric motor by supplying current to the windings in normal phases (two phases) other than the faulty phase, so that it is still possible to switch the shift range in the event of a fault in the electric motor. On the other hand, if the fault is a short-circuit fault, the connection between the electric motor and the power supply (vehicle-mounted battery) is cut off, thereby making it possible to prevent an overcurrent from flowing to the faulty phase of the electric motor.

BRIEF DESCRIPTION OF THE DRAWING

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Example embodiments of the present invention will be described in greater detail below with reference to the accompanying drawings.

Figure 1:
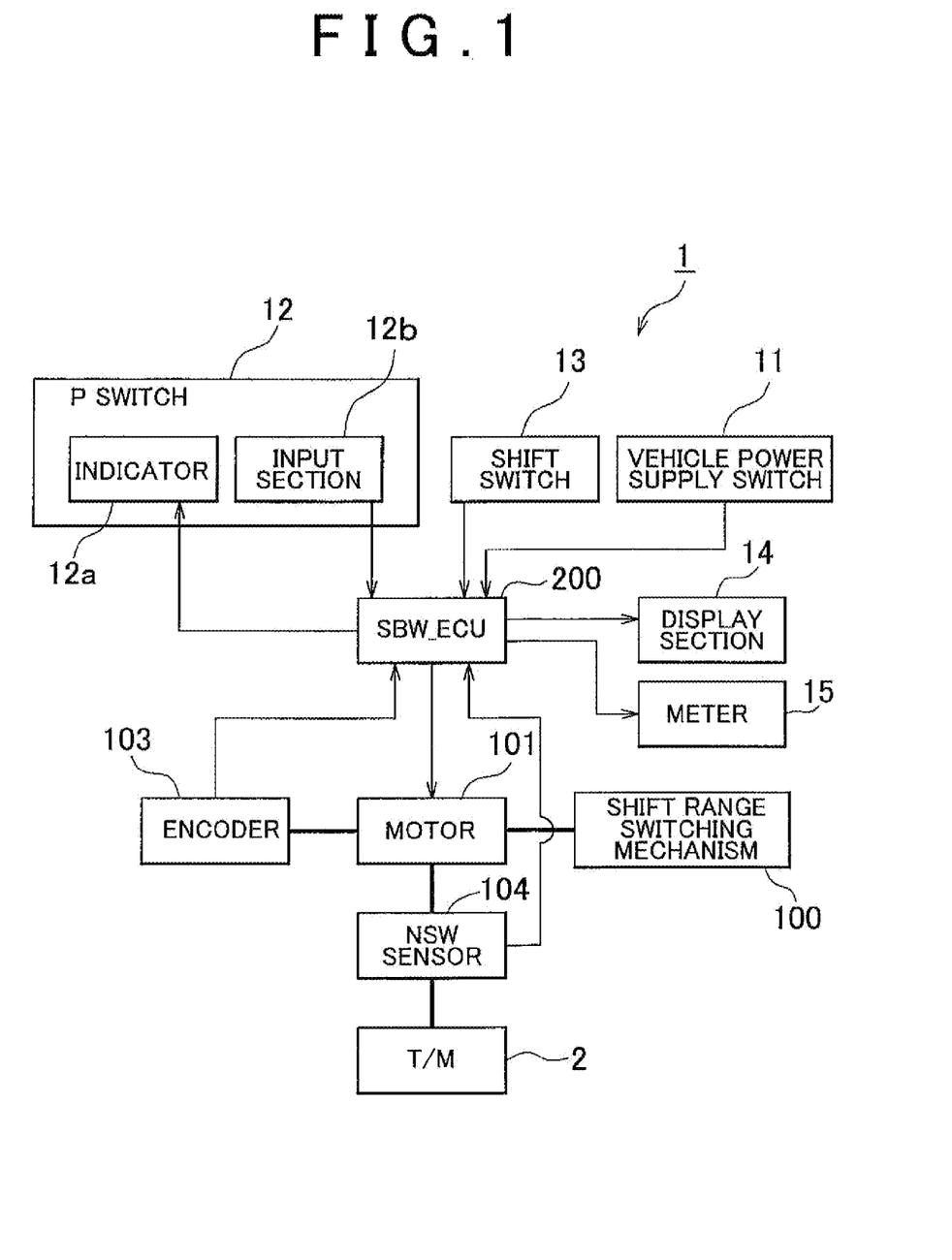
FIG. 1 is a block diagram showing the configuration of the control system of a shift switching device according to the present invention.

FIG. 1 is a block diagram showing an example of a shift switching device. A shift switching device 1 according to this embodiment is a device that switches the shift range of an automatic transmission 2 installed in a vehicle, and includes, at least, a vehicle power supply switch 11, a P switch 12, a shift switch 13, a display section 14, a meter 15, a shift range switching mechanism 100, a motor 101 that drives the shift range switching mechanism 100, an encoder 103, a NSW (non-contact neutral switch) sensor 104, a SBW_ECU (Shift-ByWire_ECU) 200, and the like. The shift switching device 1 works as a shift-by-wire device that switches the shift range of the automatic transmission 2 through electric control.

The vehicle power supply switch 11 is a switch that switches the vehicle power supply ON/OFF. Although not particularly limited, the vehicle power supply switch 11 may be, for example, an ignition switch. An instruction accepted by the vehicle power supply switch 11 from a user such as a driver is transmitted to the SBW_ECU 200. Then, when the vehicle power supply switch 11 is turned ON, electric power is supplied from a battery (not shown) installed in the vehicle, thereby activating the shift switching device 1.

The P switch 12 is a switch for switching the shift range from a range other than Parking (non-P range) to the Parking range (P range), and includes an indicator 12a to indicate the state of the switch, an input section 12b for accepting an instruction from the driver, and the like. An instruction for placing the shift range into the P range may be input through an operation (ON operation) of the input section 12b by the driver. The instruction (instruction for shifting into the P range) based on the operation of the input section 12b is input to the SBW_ECU 200. A momentary switch can be given as an example of the input section 12b.

The shift switch 13 is a switch operated by the driver. By operating the shift switch 13, the shift range of the automatic transmission 2 can be switched to the reverse range (R range), the neutral range (N range), and the drive range (D range). Also, when the shift range is placed in the P range, release of the P range can be executed. When the shift switch 13 is operated by the driver, the corresponding operation information is input to the SWB_ECU 200.

The display section 14 displays an instruction or warning to the driver. The meter 15 displays the state of vehicle equipment, shift range state, and the like. These displays made on the display section 14 and the meter 15 are controlled by the SWB_ECU 200.

The NSW sensor 104 is configured by a rotational angle sensor (for example, a potentiometer) whose output signal (output voltage) changes linearly in accordance with the rotational angle of an output shaft 121 (see FIG. 2) of the shift range switching mechanism 100 described later. The current rotational angle of the output shaft 121 (the rotational angle of a detent lever 122 described later) may be detected based on the output voltage. Also, the shift position may be detected from the output signal of the NSW sensor 104. The rotational angle detected by the NSW sensor 104 is output to the SBW_ECU 200. The motor 101 and the encoder 103 will be described later.

The SBW_ECU 200 supervises the overall operation of the shift switching device 1. For example, in order to switch the shift range between the P range and non-P range, the SWB_ECU 200 controls the drive of the motor 101 of the shift range switching mechanism 100 (FIG. 2), and displays the current state of the shift range on the indicator 12a. Specifically, for example, if the driver operates (switches ON) the input section 12b when the shift range is placed in a non-P range, the SWB_ECU 200 switches the shift range to the P range, and displays on the indicator 12a an indication that the current shift range is the P range.

Also, in accordance with the shift range designated through an operation of the shift switch 13 by the driver, the SWB_ECU 200 executes a control of switching the shift range of the automatic transmission 2 (drive control of the motor 101), and displays the current state of the shift range on the meter 15. Further, the SWB_ECU 200 displays an instruction, warning, or the like with respect to the driver on the display section 14.

In the shift switching device 1 described above, the automatic transmission 2 may be a continuously variable transmission such as a CVT, or a stepped transmission such as a planetary gear type transmission.

Figure 2:
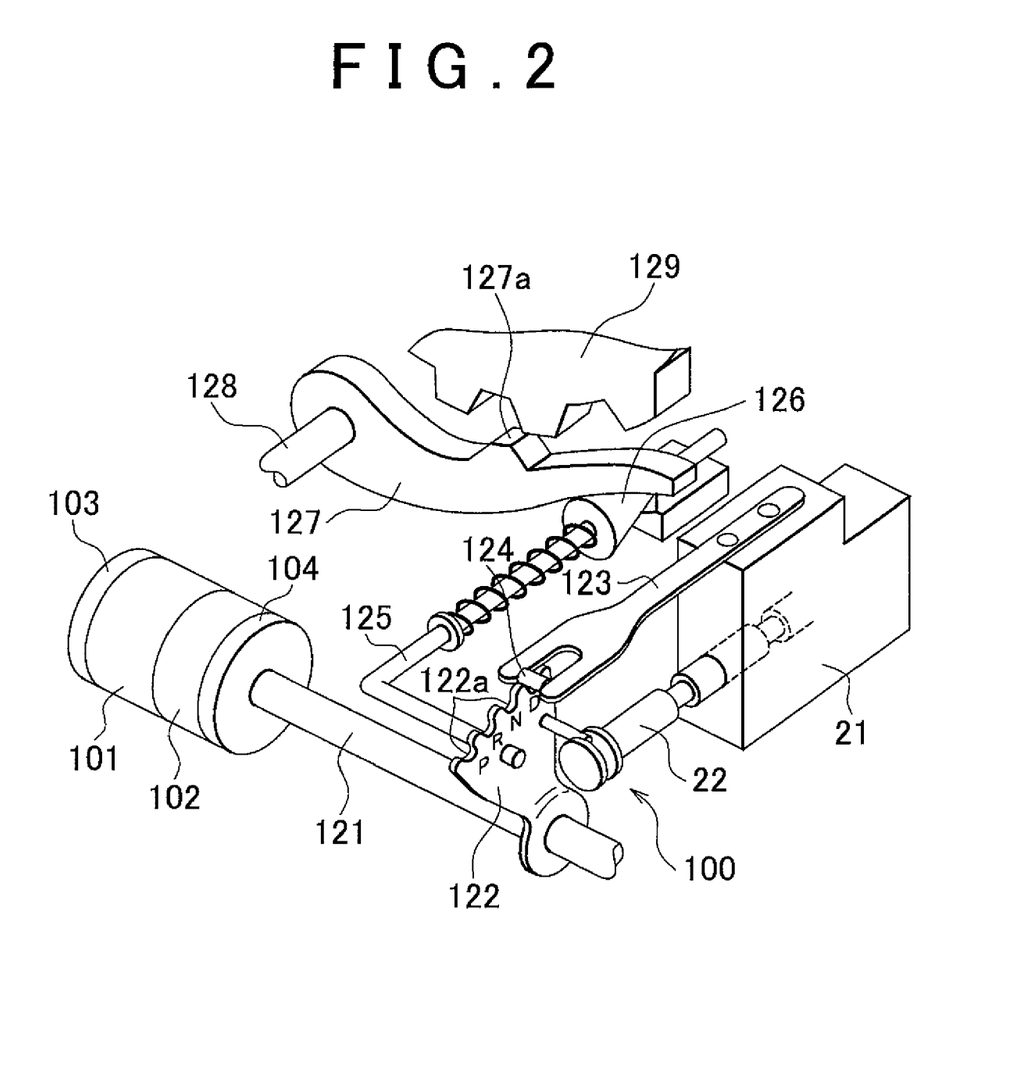
FIG. 2 is a perspective view showing the general configuration of a shift range switching mechanism.

Next, the shift range switching mechanism 100 will be described with reference to FIG. 2.

The shift range switching mechanism 100 in this embodiment is a mechanism that switches the shift range of the automatic transmission 2 to the P range, R range, N range, and D range. The motor 101 serving as a drive source for the shift range switching mechanism 100 is, for example, a synchronous motor such as a switched reluctance motor (SR motor), and is provided with a speed reduction mechanism 102. The output shaft 121 is mated and coupled to the rotating shaft of the speed reduction mechanism 102, and the NSW sensor 104 that detects the rotational angle of the output shaft 121 is provided.

The detent lever 122 for switching a manual valve 21 of a hydraulic control circuit of the automatic transmission 2 is fixed to the output shaft 121.

A spool valve 22 of the manual valve 21 is connected to the detent lever 122. By turning the detent lever 122 integrally with the output shaft 121 by the motor 101, the amount of operation of the manual valve 21 (position of the spool valve 22) is switched, thereby switching the range of the automatic transmission 2 to one of the P range, R range, N range, and D range.

The detent lever 22 has four recesses 122a for retaining the spool valve 22 of the manual valve 21 in positions respectively corresponding to the P range, R range, N range, and D range.

A detent spring (leaf spring) 123 is arranged above the detent lever 122. The detent spring 123 is fixed to the manual valve 21 in a cantilevered fashion. A roller 124 is attached to the distal end portion of the detent spring 123. The roller 124 is pressed against the detent lever 122 by the elastic force of the detent spring 123. As the roller 124 fits into the recess 122a of the detent lever 122 corresponding to a target shift range, the detent lever 122 is retained at a rotational angle for the target shift range, so the position of the spool valve 22 of the manual valve 21 is retained at the position of the target shift range.

On the other hand, an L-shaped parking rod 125 is fixed to the detent lever 122. A conical tapered cam 126 is provided at the distal end portion of the parking rod 125, and a lock lever 127 abuts on the outer circumferential surface (cam surface) of the cam 126. The lock lever 127 is configured such that the lock lever 127 moves vertically about a rotation shaft 128 in accordance with the position of the cam 126, and a lock claw 127a of the lock lever 127 engages with a parking gear 129, or the lock claw 127a disengages from the parking gear 129 due to the vertical movement, thereby locking/unlocking the rotation of the parking gear 129. The parking gear 129 is provided to the output shaft of the automatic transmission 2, and when the parking gear 129 is locked by the lock lever 127, the drive wheels of the vehicle are locked in position to prevent rotation (parking state).

In the shift range switching mechanism 100 described above, when in the P range, the parking rod 125 moves toward the lock lever 127, causing a large-diameter portion of the cam 126 to lift the lock lever 127 so that the lock claw 127a of the lock lever 127 fits into the parking ear 129, thereby locking the parking gear 129. This brings the output shaft (drive wheel) of the automatic transmission 2 into a locked state (parking state).

On the other hand, when in shift ranges other than the P range, the parking rod 125 moves away from the lock lever 127, and following this movement, the contact portion of the lock lever 127 with the cam 126 moves from a large-diameter portion to a small-diameter portion, thus moving the lock lever 127 lower. Thus, the lock claw 127a of the lock lever 127 is disengaged from the parking gear 129, thereby releasing the lock of the parking gear 129, and the output shaft of the automatic transmission 2 is released to allow rotation.

Next, the motor 101 that serves as the drive source for the shift range switching mechanism 100 will be described with reference to FIG. 3 and FIG. 4.

The motor (SR motor) 101 in this embodiment is a motor in which both a stator 111 and a rotor 112 have a salient pole structure, and has an advantage in that no permanent magnet is necessary and the structure is simple.

Along the inner circumferential portion of the stator 111 having a cylindrical shape, for example, 12 salient poles 111a are formed at equal intervals. In contrast, the rotor 32 has, for example, eight salient poles 112a formed at equal intervals along its outer circumferential portion. As the rotor 112 rotates, the respective salient poles 112a of the rotor 112 sequentially face respective salient poles 111a of the stator 111 with a small gap therebetween. A total of 12 windings 113 of U, V, and W phases are wound around the 12 salient poles 111a of the stator 111 in order. The number of salient poles 111a of the stator 111 and the number of salient poles 112a of the rotor 112 are not particularly limited, and may be changed as appropriate.

Figure 3:
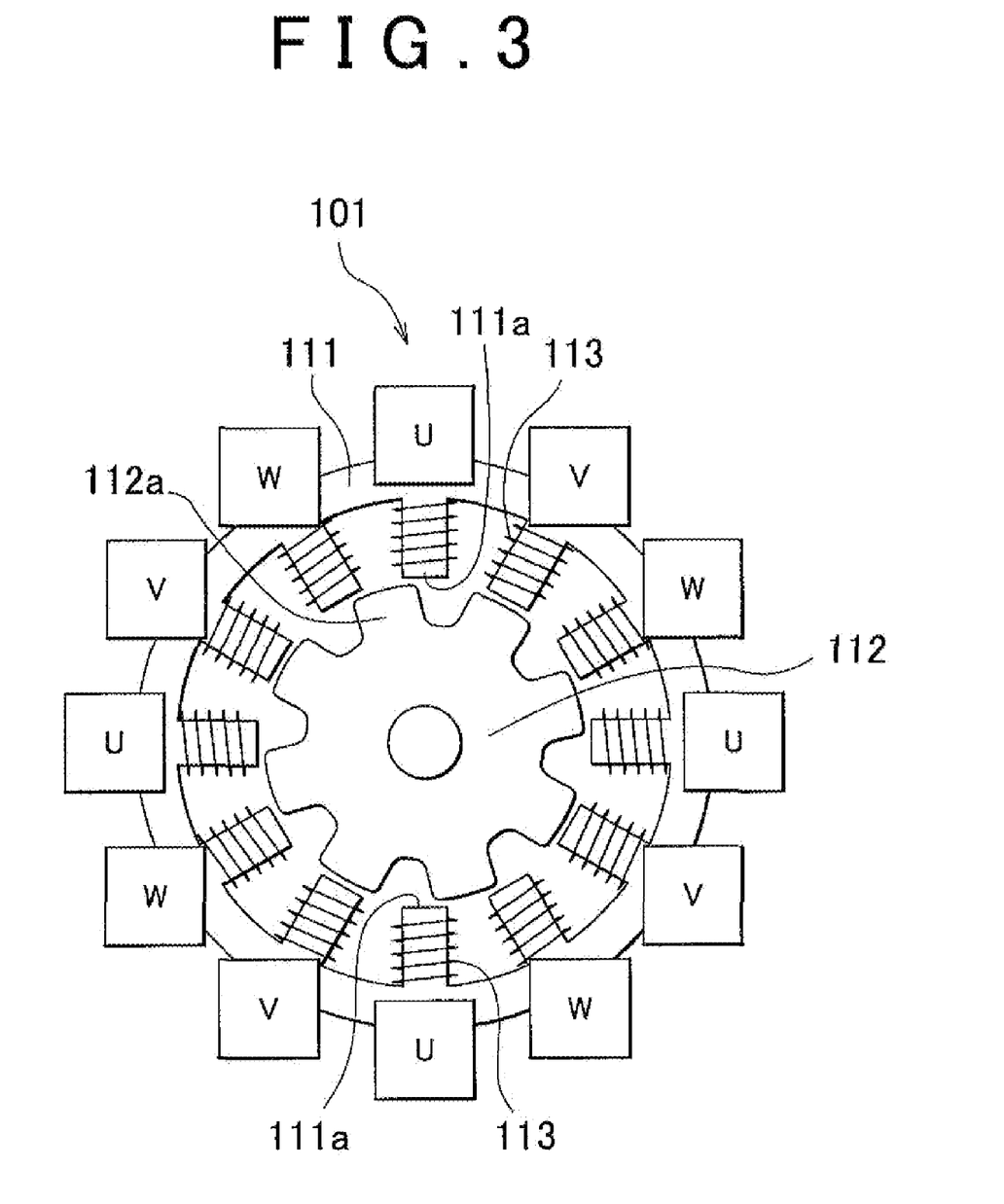
FIG. 3 is a view schematically showing the configuration of a motor used as a drive source for a shift range switching mechanism.

As shown in FIG. 3, the total of 12 windings 113 of the U, V, and W phases are wound around the 12 salient poles 111a of the stator 111 in the following order, for example: V phase→W phase→U phase→V phase→W phase→U phase→V phase→W phase→U phase→V phase→W phase→U phase.

Figure 4:
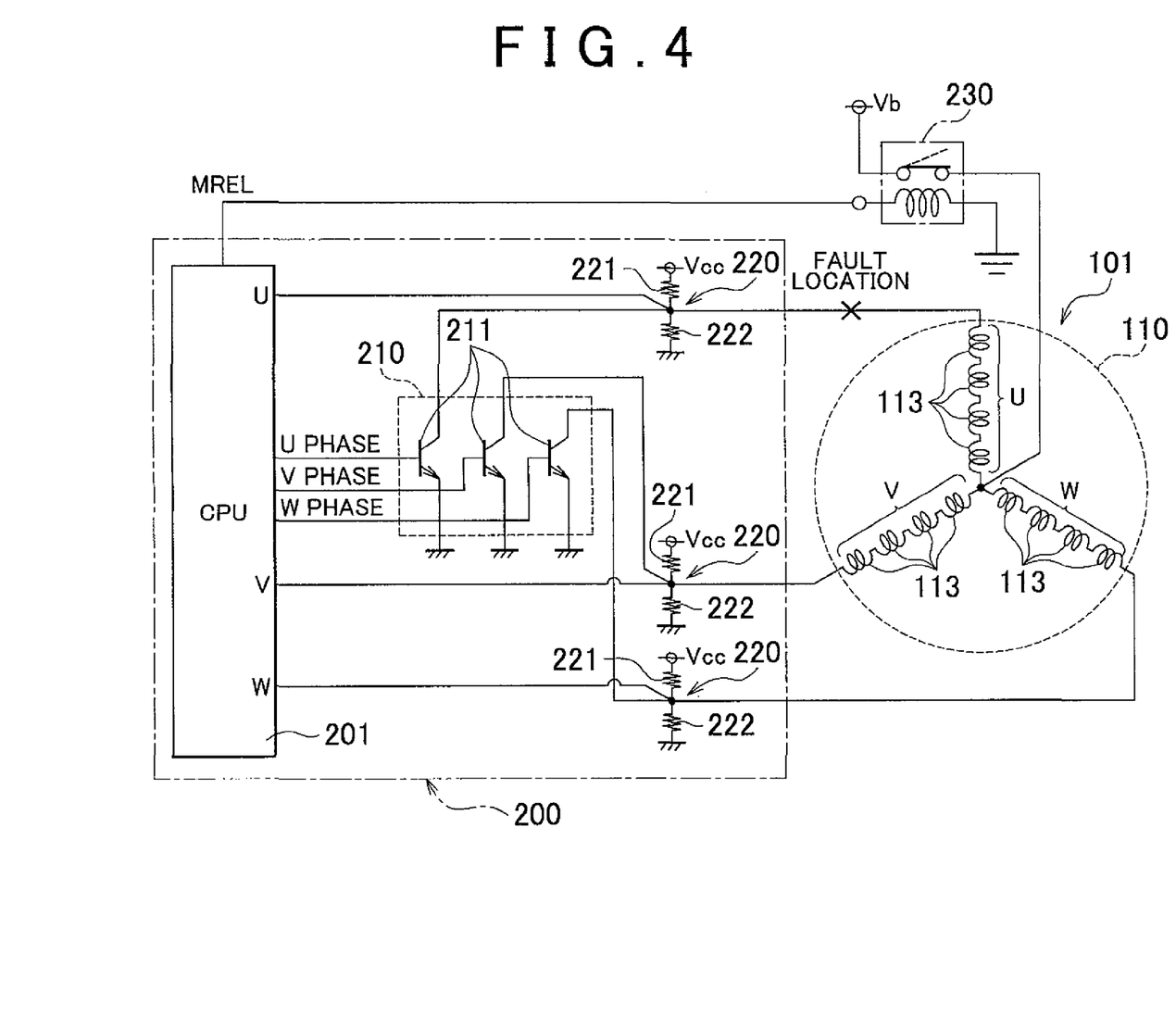
FIG. 4 is a circuit diagram of a drive circuit that drives a motor used as a drive source for a shift range switching mechanism.

Also, as shown in FIG. 4, the total of 12 windings 113 of the U, V, and W phases are connected in a Y configuration (four windings 113 corresponding to each of the U, V, and W phases are connected in series), forming a single-line drive coil 110. The drive coil 110 is driven by a motor driver 210 with a battery (not shown) installed in a vehicle as a power supply. Although the circuit configuration of the motor driver 210 shown in FIG. 4 is of a unipolar drive type in which a single switching transistor 211 is provided for each of the U, V, and W phases, a bipolar drive type circuit configuration may be employed in which two switching transistors are provided for each of the U, V, and W phases.

In this embodiment, the neutral point of the drive coil 110 is connected to the positive pole (voltage Vb) side of the battery, and one end of the winding 113 of each of the U, V, and W phases of the drive coil 110 is connected to each of the switching transistors 211 of the motor driver 210. The ON/OFF of each of the switching transistors 211 of the motor driver 210 is controlled by a CPU 201 of the SBC_ECU 200. Also, a motor relay 230 is connected between the neutral point of the drive coil 110 and the positive pole (voltage Vb) of the battery. The motor relay 230 is normally ON, and is set OFF by a command signal from the CPU 201 of the SBC_ECU 200. Specifically, the motor relay 230 is set OFF if a "short-circuit fault" described later is determined by the SBW_ECU 200.

Next, detection of a break/short-circuit in the motor 101 will be described.

In this embodiment, a fault detection circuit 220 is provided in the current supply line of the winding 113 of each of the U, V, and W phases to detect a fault (break/short-circuit) in the winding 113 of each of the U, V, and W phases.

The fault detection circuit 220 includes two resistors 221 and 222 connected in series between the DC power supply voltage Vcc (for example, 5 V) side and the ground side. The intermediate connection point of the two resistors 221 and 222 is connected to the current supply line of each of the U, V, and W phases, and the intermediate connection point of the two resistors 221 and 222 is connected to each input port of the CPU 201 via a signal line, so the voltage level at the intermediate connection point of the two resistors 221 and 222 (the voltage level of the current supply line of each of the U, V, and W phases) is read into the CPU 201 as a detection signal via each input port. The resistance value R1 of the resistor 221 on the DC power supply voltage Vcc side, and the resistance value R2 of the resistor 222 on the ground side are so set as to satisfy the relationship R1>R2.

In the fault detection circuit 220 of the structure described above, if the current supply line of the winding 113 is normal (no break/no short-circuit), when the switching transistor 211 is turned OFF, the voltage level at the intermediate connection point of the two transistors 221 and 222 of the fault detection circuit 220 increases due to the application of the battery voltage Vb via the winding 113, so the detection signal of the fault detection circuit 220 increases. Also, when turning the switching transistor 211 ON, the intermediate connection point of the two transistors 221 and 222 is brought into conduction with the ground side via the switching transistor 211, so the detection signal of the fault detection circuit 220 decreases.

In contrast, if the current supply line of the winding 113 is at fault, for example, a fault is occurring at the location (U phase) shown in FIG. 4, the battery voltage Vb is not applied to the intermediate connection point of the two resistors 221 and 222 of the fault detection circuit 220 even when the switching transistor 211 is turned OFF. Thus, the detection signal of the fault detection circuit 220 in the U phase remains at a low level, and does not flip to a high level. In the case of the V and W phases as well, if a fault occurs at a similar location, the detection signal of the fault detection circuit 220 remains at a low level even when the switching transistor 211 is turned OFF.

Based on these relationships, if the detection signal of the fault detection circuit 220 of each of the U, V, and W phases increases when turning OFF the switching transistor 211 of each of the U, V, and W phases, the SBC_ECU 200 (CPU 201) determines that the current supply line of the winding 113 of each of the U, V, and W phases is normal (no break). On the other hand, if the detection signal of the fault detection circuit 220 of each of the U, V, and W phases remains unchanged when turning OFF the switching transistor 211 of each of the U, V, and W phases, it is determined that there is a fault (break/short-circuit) in the current supply line of the winding 113 of each of the U, V, and W phases.

It should be noted, however, that while the circuit configuration shown in FIG. 4 makes it possible to identify a faulty phase of the motor 101, the system configuration cannot discriminate between a break and a short-circuit. That is, if the fault at the location shown in FIG. 4 is either a break, or a ground short-circuit, the battery voltage Vb is not applied to the intermediate connection point of the two resistors 221 and 222 of the fault detection circuit 220, thus, the detection signal of the fault detection circuit 220 remains at low level even when the switching transistor 211 is turned OFF. Therefore, when a fault occurs in the current supply line of the winding 113, it is impossible to determine whether the fault is a break or a short-circuit.

While in the circuit configuration shown in FIG. 4 the motor driver 210 and the fault detection circuit 220 of each of the U, V, and W phases are installed on the circuit board of the SBW_ECU 200, the present invention is not restricted to this configuration. One or both of the motor driver 210 and the fault detection circuit 220 may be provided outside the SBW_ECU 200.

The motor 101 in this embodiment is provided with the encoder 103 (see FIG. 1 and FIG. 2) that detects the rotational angle of the rotor 112. The encoder 103 is, for example, a magnetic rotary encoder, and is configured to output pulse signals of A, B, and Z phases to the SBW_ECU 200 synchronously with the rotation of the rotor 112 of the motor 101.

The SBW_ECU 200 counts both of the rising and falling edges of an A-phase signal and a B-phase signal outputt from the encoder 103, and switches the current supply phase of the motor 101 in a predetermined order by the motor driver 210 based on the encoder count value, thereby rotationally driving the motor 101. At this time, the SBW_ECU 200 determines the rotation direction of the rotor 112 based on the sequence of the A-phase signal and the B-phase signal. The SBW_ECU 200 counts up the encoder count value in the case of normal rotation (rotation in a direction or from the P range to the D range), and counts down the encoder count value in the case of reverse rotation (rotation in a direction from the D range to the P range). Thus, the correspondence between the encoder count value and the rotational angle of the motor 101 is maintained regardless of whether the motor 101 rotates in the normal direction or the reverse direction. Accordingly, irrespective of whether the motor 101 rotates in the normal direction or the reverse direction, the rotational angle of the motor 101 is detected from the encoder count value, and current is supplied to the winding 113 of a phase corresponding to the rotational angle, thereby rotationally driving the motor 101. The Z-phase signal of the encoder 103 is used for detecting the reference rotational angle of the rotor 112.

In the shift switching device 1 configured as described above, when the driver operates the shift switch 13, the SBW_ECU 200 sets a target rotational angle (target value of the encoder count value) corresponding to the shift range that is selected by the shift switch 13, starts supplying current to the motor 101, and executes feedback control (F/B control) of the motor 101 so that the motor 101 stops at a position where the detected rotational angle of the motor 101 (encoder count value) coincides with the target rotational angle. Further, the SBW_ECU 200 reads an output signal of the NSW sensor 104, and based on the output signal, the SBW_ECU 200 determines the current rotational angle of the output shaft 121 (the amount of operation of the manual valve 21), that is, whether the current shift range is the P range, R range, N range, or D range, to confirm whether the shift range has been switched properly.

First, if, for example, a fault occurs at the location shown in FIG. 4 (in the current supply line between the winding 113 and the switching transistor 211 in the U phase) in the motor 101 that is a drive source for the shift switching device 1, and the fault is a ground short-circuit, the U phase remains constantly energized, and since the U phase drags the other two phases (V phase and W phase), the rotation of the rotor 112 of the motor 101 cannot be started.

In contrast, if the fault is a break, even if there is a break in the current supply line of the winding 113 of one phase, the rotation of the rotor 112 cam be started up by using the windings 113 of the other phases. That is, even if current cannot be passed through the winding 113 of the broken phase (e.g., the U phase), the rotor 112 of the motor 101 may be rotated by passing current through the normal windings 113 of the other phases (V phase and W phase), so the shift range switching mechanism 101 can be operated. To implement such a motor drive under fault conditions, it is necessary to identify a fault as a break fault when the motor 101 is at fault. However, as mentioned above, the fault detection circuit 220 shown in FIG. 4 cannot discriminate between a break and a short-circuit. A conceivable method for determining a short-circuit is to provide a short-circuit detection sensor to thereby discriminate between a break and a short-circuit. In this case, however, the number of parts increases, which disadvantageously leads to an increase in cost.

With these considerations in mind, the most characteristic feature of this embodiment resides in the execution of a failsafe control that makes it possible to determine a break/short-circuit when the motor 101 is at fault, and executes a measure in accordance with the determination result.

Figure 5:
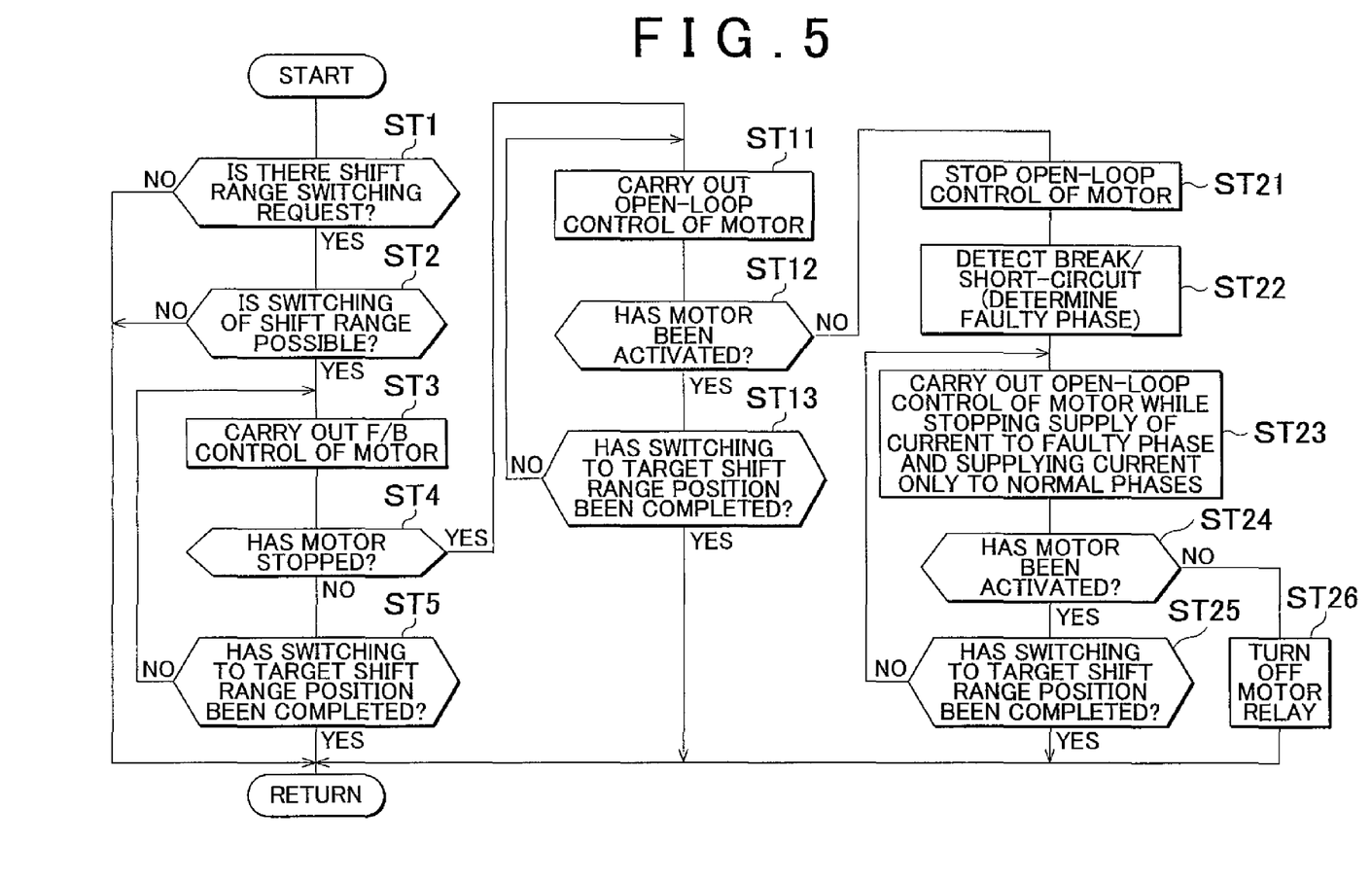
FIG. 5 is a flowchart showing a control routine of shift switching control.

A specific example of such control will be described with reference to the flowchart of FIG. 5, and to FIGS. 1 to 4. The control routine of FIG. 5 is repeatedly executed at each predetermined time period by the SBW_ECU 200.

In step ST1, it is determined whether there is a request to switch the shift range based on a signal from the shift switch 13 or the P switch 12, and if the result of the determination is negative (if there is no shift range switching request), this routine is exited once. If the result of the determination in step ST1 is positive (there is a shift range switching request), the routine proceeds to step ST2.

In step ST2, it is determined whether switching of the shift range is possible. Specifically, the current shift range and the requested shift range to switch to (target shift range) are compared to each other, and if the current shift range and the target shift range are different, it is determined that switching of the shift range is possible, and the routine proceeds to step ST3. On the other hand, if the current shift range and the target shift range are the same, switching of the shift range is determined to be impossible, and this routine is exited once.

In the determination process of step ST2, if the vehicle speed is high, the foot brake is ON, or operation of the shift-by-wire device is abnormal, switching of the shift range is determined to be impossible, regardless of the above-mentioned determination.

In step ST3, feedback control (F/B control) is executed on the motor 101 so that the detected value (the actual encoder count value) of the rotational angle of the motor 101 of the shift range switching mechanism 100 coincides with the target rotational angle (the target value of the encoder count value) corresponding to the above-mentioned target shift range. Next, in step ST4, it is determined whether or not the motor 101 has stopped. Specifically, if, after starting the feedback control of the motor 101, the count value of the encoder 103, or the sensor value of the NSW sensor 104 has not changed, it is determined that the motor 101 has stopped, and the routine proceeds to step ST11.

If the result of the determination in step ST4 is negative, the feedback control of the motor 101 continues, and at the point when switching to the target shift range position is complete (at the point when the result of the determination in step ST5 becomes positive), the feedback control of the motor 101 is terminated, and the routine is exited once. The completion of switching to the target shift range position is determined based on the output signal of the NSW sensor 104.

If the result of the determination in step ST4 is positive, that is, if the motor 101 has stopped for some reason, the drive control of the motor 101 is switched from the feedback control to open-loop control (step ST11). That is, since the motor 101 in this embodiment is an SR motor with an encoder, if the motor 101 stops while feedback control is executed, deviation occurs in the positional relationship between the excitation phase of the motor 101 and the count value of the encoder 103, thereby making it impossible to execute feedback control. Thus, the drive control of the motor 101 is switched to the open-loop control.

Next, in step ST12, it is determined whether the motor 101 has been activated (rotated). Specifically, if, after starting the open-loop control of the motor 101, the count value of the encoder 103 or the sensor value of the NSW sensor 104 has changed, it is determined that the motor 101 has been activated.

If the result of the determination in step ST12 is positive, switching of the shift range is possible, so the open-loop control of the motor 101 is continued, and at the point when switching to the target shift range position is complete (at the point when the result of the determination in step ST13 becomes positive), the process ends. The completion of switching to the target shift range position is determined based on the output signal of the NSW sensor 104.

However, if the result of the determination in step ST12 is negative (if the motor 101 has not been activated upon carrying out the open-loop control), the open-loop control of the motor 101 is stopped (step ST21). Then, in step ST22, detection of a break/short-circuit in the motor 101 is carried out to determine a faulty phase in which a fault is occurring.

Specifically, the detection signal of each fault detection circuit 220 is monitored the switching transistor 211 for each of the U, V, and W phases shown in FIG. 4 is switched OFF, and the phase in which the detection signal of the fault detection circuit 220 is at low level is determined as a faulty phase. For example, if a fault is occurring at the location shown in FIG. 4, the detection signal of the fault detection circuit 220 provided in the current supply line in the U phase decreases. Accordingly, it is determined that a break/short-circuit fault is occurring in the U phase.

After the fault determination mentioned above, in step ST23, open-loop control of the motor 101 is carried out while supplying current to the other two normal phases (V phase and W phase) without supplying current to the faulty phase (U phase). At this time, if a ground short-circuit is occurring in one of the U, V, and W phases of the motor 101, even when open-loop control of the motor 101 is carried out by using normal phases, the faulty phase in which a short-circuit is occurring drags the other two phases, so the motor 101 is not activated (does not rotate). In contrast, if there is a break in the winding 113 of one of the U, V, and W phases of the motor 101, the motor 101 is activated (rotates) with torque generated by supply of current to the normal phases (two phases). Therefore, by determining activation/deactivation of the motor 101 upon carrying out the open-loop control (step ST23) of the motor 101 mentioned above, it is possible to discriminate between a break fault and a short-circuit fault.

Accordingly, in this embodiment, it is determined whether or not the motor 101 has been activated (rotate) through open-loop control at the time of a fault (step ST24). Specifically, the motor 101 is determined to have been activated when the count value of the encoder 103, or the sensor value of the NSW sensor 104 has changed.

If the motor 101 has been activated (if the result of the determination in step ST24 is positive), switching of the shift range is possible, so the open-loop control of the motor 101 (control of current supply to normal phases (two phases)) is continued, and at the point when switching to the target shift range position is complete (at the point when the result of the determination in step ST25 becomes positive), the routine is exited once. The completion of switching to the target shift range position is determined based on the output signal of the NSW sensor 104.

However, if the motor 101 has not been activated (rotated) through the open-loop control when a fault occurs (if the result of the determination in step ST24 is negative), it is determined that there is a short circuit in the fault in the motor 101, and the motor relay 230 shown in FIG. 4 is turned OFF to cut off the connection between the drive coil 110 and the battery (step ST26).

As described above, according to the shift switching control in this embodiment, determination as to whether a fault in the motor 101 is a short-circuit fault or a break fault can be made without addition of a part such as a short-circuit detection sensor. If a fault in the motor 101 is a break fault (break fault in one phase), the rotor 112 is rotationally driven by supplying current to the windings 113 of normal phases (two phases) other than the faulty phase, thereby making it possible to continue switching of the shift range even when the motor 101 is at fault. On the other hand, if a fault in the motor 101 is a short-circuit fault, the motor relay 230 is turned OFF to cut off the connection between the drive coil 110 and the battery voltage Vb, thereby making it possible to prevent flow of an overcurrent to the faulty phase of the motor 101.

Next, another embodiment of the present invention will be described. While the above-described embodiment is directed to a case where the present invention is applied to a shift range switching mechanism for switching the shift range to the P, R, N, and D shift ranges, the present invention is not restricted to this. For example, the present invention is also applicable to another arbitrary shift range switching mechanism or the like with the second range (2) or low range (L) added to the P, R, N, and D ranges. Further, the present invention is also applicable to a shift range switching mechanism that selectively switches between the two ranges of the P range and a non-P range in conjunction with the turning operation of the detent lever 122.

In the above-mentioned embodiment, the rotational angle of the output shaft (the rotational angle of the detent lever 122) is detected by the NSW sensor 104. Alternatively, for example, the amount of operation (the rotational angle, the amount of movement, or the like) of a part that is driven integrally with the output shaft 121, such as the amount of operation of the spool valve 22 of the manual valve 21, may be detected.

Although an SR motor is used as the electric motor in the above-mentioned embodiment, the present invention is not restricted to this. It is also possible to use another brushless type motor in which the rotational position of the rotor is detected based on the count value of the output signal of the encoder, and the motor phase to which current is supplied is sequentially switched.

Figure 6:
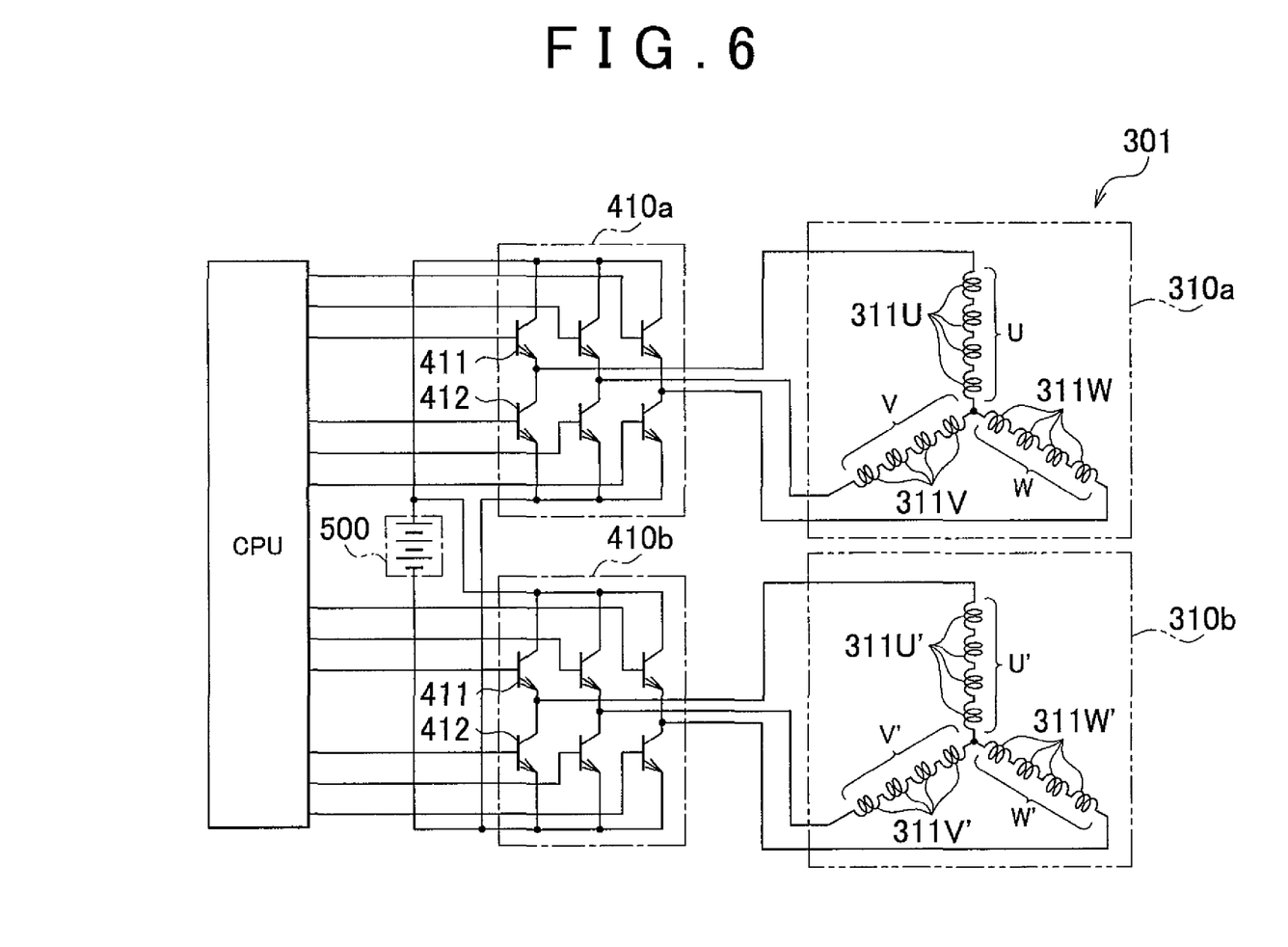
FIG. 6 is a diagram schematically showing the configuration of a double-coil motor.

Also, as the electric motor, as shown in FIG. 6, for example, there may be used a double-coil motor 301 having two lines of drive coil including a drive coil (winding portion) 310a made up of windings 311U, 311V, and 311W, and a drive coil (winding portion) 310b made up of windings 311U', 311V', and 311W'. If the double-coil motor 301 is also used, the fault detection circuit 220 shown in FIG. 4 or a current detection circuit may be provided in the current supply line in each of the U, V, W, U', V', and W' phases to detect a fault (break/short-circuit).

The respective drive coils 310a and 310b of the motor 301 shown in FIG. 6 are driven by motor drivers 410a and 410b with a battery 500 installed in the vehicle as a power supply. Also, the circuit configuration of the motor drivers 410a and 410b shown in FIG. 6 is a bipolar-drive circuit configuration in which a transistor 411 whose collector is connected to the positive pole side of the battery 500, and a transistor 412, whose collector is connected to the emitter of the transistor 411 and whose emitter is connected to the negative pole side of the battery 500, are provided for each of the U, V, W, U', V', and W' phases.

Although a magnetic encoder is used in the above-mentioned embodiment, the present invention is not restricted to this. For example, an optical encoder or a brush type encoder may be used instead.

Although in the above embodiment a fault (break/short-circuit) is determined by detecting the voltage level of the current supply line in each phase of the electric motor (SR motor), the present invention is not limited to this. A current detection circuit may be provided in the current supply line in each phase of the electric motor, and a winding fault (break/short-circuit) may be determined based on the current detection value of the current detection circuit instead.

While the invention has been described with reference to example embodiments thereof, it is to be understood that the invention is not limited to the described embodiments or constructions. To the contrary, the invention is intended to cover various modifications and equivalent arrangements. In addition, while the various elements of the embodiments are shown in various example combinations and configurations, other combinations and configurations, including more, less or only a single element, are also within the scope of the invention.

What is claimed is:

1. A shift-by-wire type shift switching device that switches a shift range of an automatic transmission using an electric motor, comprising:
    a controller that determines whether a fault has occurred in a current supply line of each phase of the electric motor on a phase-by-phase basis, executes an open-loop control of the electric motor using only the phases in which it has been determined that a fault has not occurred, and determines whether a fault has occurred in the current supply line by detecting an activation state of the electric motor when the open-loop control of the electric motor is executed, wherein the controller determines that a "short-circuit fault" has occurred in a current supply line if the electric motor is not activated when the open-loop control of the electric motor is executed.

2. The shift switching device according to claim 1, wherein the controller cuts off supply of electric power to the electric motor, if it is determined that the fault in the current supply line is a "short-circuit fault."

3. The shift switching device according to claim 1, wherein if the electric motor is activated when executing the open-loop control of the electric motor, the controller continues the open-loop control of the electric motor to switch the shift range of the automatic transmission.

4. The shift switching device according to claim 1, further comprising at least one of:

an angle detector that detects a rotational angle of the electric motor; and a shift range position detector that detects a shift range position of the automatic transmission, wherein the controller determines that the fault in a current supply line is a "short-circuit fault" if a detected value of the angle detector or the shift range position detector does not change when executing the open-loop control of the electric motor; and determines that the fault is a "break fault" if the detected value of the angle detector or the shift range position detector changes when executing the open-loop control of the electric motor.

5. The shift switching device according to claim 1, wherein the electric motor is a three phase AC motor, and when it is determined that a fault has occurred in the current supply line in one phase of the three phase AC motor, the controller executes the open-loop control of the three phase AC motor in the other two phases.

6. The shift switching device according to claim 1, wherein the electric motor is a switched reluctance motor.

7. The shift switching device according to claim 1, wherein the electric motor is a double-coil motor.

8. A shift-by-wire shift type switching method that switches a shift range of an automatic transmission using an electric motor, comprising:

determining whether a fault has occurred in a current supply line of each phase of the electric motor on a phase-by-phase basis;

executing an open-loop control of the electric motor using only the phases in which it has been determined that a fault has not occurred; and determining whether a fault has occurred in the current supply line by detecting an activation state of the electric motor when the open-loop control of the electric motor is executed; and determining that a "short-circuit fault" has occurred in the current supply line if the electric motor is not activated when the open-loop control of the electric motor is executed.

9. The shift switching method according to claim 8, further comprising:

cutting off supply of electric power to the electric motor, if it is determined that the fault in the current supply line is a "short-circuit fault".

10. The shift switching method according to claim 8, further comprising:

continuing the open-loop control of the electric motor to switch the shift range of the automatic transmission, if the electric motor is activated when the open-loop control of the electric motor is executed.

11. The shift switching method according to claim 8, further comprising:

detecting a rotational angle of the electric motor or detecting a shift range position of the automatic transmission; and determining that the fault in a current supply line is a "short-circuit fault" if the detected rotational angle or the detected shift range position does not change when the open-loop control of the electric motor is executed, and determining that the fault is a "break fault" if the detected rotational angle or the detected shift range position changes when the open-loop control of the electric motor is executed.

12. The shift switching method according to claim 8, wherein if the electric motor is a three phase AC motor, when it is determined that a fault has occurred in the current supply line in one phase of the three phase AC motor, the open-loop control of the three phase AC motor is executed in the other two phases.

\* \* \* \* \*